United States Patent [19]
Nichols

[11] Patent Number: 5,273,163
[45] Date of Patent: Dec. 28, 1993

[54] CENTRIFUGAL PARTICLE CLASSIFIER HAVING UNIFORM INFLUX DISTRIBUTOR

[75] Inventor: Carl W. Nichols, Sylacauga, Ala.

[73] Assignee: Luzenac America, Inc., Englewood, Colo.

[21] Appl. No.: 824,580

[22] Filed: Jan. 23, 1992

[51] Int. Cl.⁵ .............................................. B07B 4/00
[52] U.S. Cl. ................................... 209/144; 209/154
[58] Field of Search .............. 209/144, 142, 143, 154; 55/406, 408, 409

[56] References Cited

U.S. PATENT DOCUMENTS

| | | |
|---|---|---|
| 1,523,611 | 1/1925 | Ryding . |
| 2,991,844 | 7/1961 | Nomar . |
| 3,409,131 | 11/1968 | Petersen et al. . |
| 3,561,195 | 2/1971 | Bouru . |
| 3,576,721 | 4/1971 | Mason ................................ 209/144 |
| 3,720,313 | 3/1973 | Lapple . |
| 3,767,045 | 10/1973 | Voelskow ........................... 209/144 |
| 4,198,290 | 4/1980 | Summers ............................ 209/144 |
| 4,251,356 | 2/1981 | Harte ................................. 209/250 |
| 4,268,281 | 5/1981 | Erickson ........................... 55/408 X |
| 4,361,490 | 11/1982 | Saget ................................ 209/144 X |
| 4,390,419 | 6/1983 | Barthelmess .................... 209/144 X |
| 4,398,932 | 8/1983 | Dehne ............................... 209/144 X |
| 4,409,097 | 10/1983 | Barthelmess .................... 209/144 X |
| 4,799,595 | 1/1989 | Binder .............................. 209/154 X |
| 4,869,786 | 9/1989 | Hanke ............................... 209/144 X |
| 4,923,491 | 5/1990 | Lawless et al. ................. 209/144 X |
| 5,025,930 | 6/1991 | Barthelmess ....................... 209/144 |

FOREIGN PATENT DOCUMENTS

| | | | |
|---|---|---|---|
| 862177 | 2/1941 | France ................................. 55/409 |
| 837374 | 6/1981 | U.S.S.R. ............................ 209/144 |

*Primary Examiner*—David H. Bollinger
*Attorney, Agent, or Firm*—Sheridan Ross & McIntosh

[57] ABSTRACT

A classifier rotor mounted for rotation about a rotor axis inside a classification chamber for separating a fines fraction includes a plurality of disks mounted in parallel, spaced-apart relation along the rotor axis and a plurality of classifier blades axially mounted between the disks at the disk periphery. A uniform influx fluid distribution tube disposed between the disks of the classifier rotor is connected to a vacuum source to remove the fines fraction. The uniform influx fluid distribution tube includes a plurality of perforations of varying sizes in the region between the disks to compensate for velocity and pressure variations, thus creating a uniform air flow along the entire length of the classifier rotor.

16 Claims, 5 Drawing Sheets

CENTRIFUGAL PARTICLE CLASSIFIER HAVING UNIFORM INFLUX DISTRIBUTOR

BACKGROUND OF THE INVENTION

1. Field of the Invention

This invention relates to centrifugal particle classifiers in general, and in particular to a forced vortex particle classifier having a uniform influx fluid distributor to enhance particle classification and throughput.

2. Background of the Invention

In the field of powder technology, classification is generally defined as the process of separating a powder into a coarse fraction and a fine fraction. The coarse comprises coarse particles having sizes equal to and larger than a cut size, whereas the fine fraction comprises fine particles having sizes equal to and less than the cut size. The cut size is equivalent to the separation point, i.e., that particular size of particles about which the powder is separated.

Numerous types of classification systems exist and have been used with varying degrees of success to separate or classify the powder into the coarse and fine fractions. Centrifugal air classifiers are among the more common types of classification systems and divide airborne powders (aerosols) by subjecting them to high centrifugal forces and opposing airflows. As is well-known, the centrifugal forces dominate the dynamics of large particles, whereas aerodynamic drag forces (Stokes forces) dominate the dynamics of the smaller particles. In a centrifugal classifier, the large particles above the design cut size are thrown outwardly by centrifugal forces and are therefore effectively separated from the small particles, which remain entrained in the classifying air.

Centrifugal classification systems can take many forms, but usually can be grouped into one of two classes: "free" vortex systems or "forced" vortex systems, depending on the particular means used to create and maintain the vortices in the classification chambers. Most free vortex classifiers use curved vanes or stators to generate the vortices, whereas most forced vortex classifiers use spinning rotors to establish and maintain the vortices.

Most forced vortex centrifugal classifiers have a rotor or classifier cage mounted for rotation within a hollow stator, so that the rotor and stator are separated by a narrow annular air gap. The rotor defines a hollow coaxial chamber that is in communication with the air gap along the periphery of the rotor and also in communication with a central opening for the egress of the classifying fluid, usually air, along with the entrained fine fraction of the powder. Typically, the classifying air is supplied to the chamber through the gap and a vortex is produced generally within the rotor by the rotation of the rotor itself. The powder to be classified is supplied to the vortex and the coarse fraction of the powder, which is forced by centrifugal action towards the stator, is removed through a coarse fraction passageway, while the fine fraction is removed with the fluid through the central axial opening in the rotor.

Depending on the particular design of the forced vortex centrifugal classifier, the powder may enter the air gap through the stator along a radius of the chamber, so that the classifying air and the powder initially enter the air gap traveling perpendicular to each other. However, other forced vortex classifiers do not require that the powder and classifying air be separate, and instead mix the powder with the classifying air before it is introduced into the classifier. Examples of forced vortex centrifugal classifiers can be found the patents issued to Nomar, U.S. Pat. No. 2,991,844; Bouru, U.S. Pat. No. 3,561,195; Lapple U.S. Pat. No. 3,720,313; Voelskow, U.S. Pat. No. 3,767,045; Erickson, U.S. Pat. No. 4,268,281; Barthelmess, U.S. Pat. Nos. 4,409,097 and 4,390,419.

The material handling capacity or throughput of a forced vortex centrifugal classifier is principally dependent on the axial length and diameter of the rotor or classifier cage, i.e., its circumferential surface or the cylindrically annular chamber in which the classification is performed. The other essential parameter of the classification process, namely the particle size limit differentiating the fine material from the coarse material (the cut size), is on the one hand determined by the diameter and rotational speed of the classifier cage and on the other hand by the external diameter of the classifying chamber and on the inflow rate of the classifying air into the classifying chamber. In both cases, the cut size is dependent on the centrifugal forces acting on the particles being classified.

While it is theoretically possible to increase the throughput of the classifier by increasing the diameter of the centrifuge cage, practical restrictions on the cage diameter exist since the centrifugal forces increase on a square law basis, thus rapidly increasing the forces acting on the centrifuge cage. Another factor limiting the size of the centrifuge cage diameter is the decrease in curvature of the classifying air path (i.e., the vortex) as the diameter of the cage increases. This curvature increase can be compensated by higher outflow speed or higher classifying air quantities, but these and the increasing resistance and frictional losses impose unacceptably high power requirements.

The axial length of the centrifuge cage is also limited due to the increasing torsional loading (wind-up) and axial deflection of the cage shaft that typically accompany an increase in cage length. However, these structural problems usually can be reduced by proper cage design and by supporting the cage shaft at both ends. However, even if these structural problems are solved, the axial length of the centrifuge cage is particularly limited by the varying airflow rates along the cage edges where the classifying air and fines pass between the blades.

Essentially, the flow rates along the jacket-like circumferential surface of the centrifuge cage are directly related to the suction within the cage. This suction is at a maximum level at the central coaxial opening (fines outlet) from the cage and decreases towards the closed end of the cage. These varying flow rates along the length of the cage lead to differences in the separation quality or selectivity of the classifier. As a result, oversize material passes into the fines in the vicinity of the fines outlet where maximum suction action occurs, while at the greatest distance from the fines outlet, undersize material will remain with the coarse material and be rejected with the coarse fraction. These selectivity disadvantages increase with the magnitude of the axial length of the centrifuge cage, and heretofore have limited the throughput of such classifiers if an acceptably narrow cut size is to be maintained.

One solution to overcome the aforementioned disadvantages resulting from the different flow rates along the axial direction of the cage has been to add an additional fines outlet to the other end of the cage, as disclosed in European Patent 67 895B1. However, this is not a complete solution, as there will still be diminished air flow at the midpoint of the cage. Further, providing such an additional fines outlet can lead to difficulties in adequately supporting both ends of the cage, increasing the chances for cage vibration and flutter.

The patent issued to Hanke, U.S. Pat. No. 4,869,786 recognizes this problem and instead solves the throughput limitation imposed by the flow variations along the cage by utilizing a multi-stage design with a plurality of centrifugal cages and chambers. More specifically, Hanke provides two stages, a pre-classification and a re-classification stage, to achieve improved separation efficiency and throughput. Unfortunately, however, Hanke's multi-stage design is large and cumbersome and requires relatively complicated apparatus.

SUMMARY OF THE INVENTION

Accordingly, it is a general object of this invention to provide an improved forced vortex classifier having increased throughput.

It is another general object of this invention to provide an improved forced vortex classifier having a more precise cut size.

It is a further object of this invention is to provide a forced vortex classifier having a constant airflow and pressure drop ratio over a wide range of rotor speeds.

It is yet another object of this invention to provide an improved forced vortex classifier that reduces the amount of suction required in the fines collection system.

It is a more specific object of this invention to provide a forced vortex classifier with a longer classifying cage.

To achieve the foregoing and other objects and in accordance with the purposes of the present invention, as embodied and broadly described herein, the improved centrifugal particle classifier according to this invention may comprise a classifier rotor or centrifugal cage mounted for rotation about a rotor axis inside a classification chamber. In the preferred embodiment, the classifier rotor includes four disks mounted in parallel, spaced-apart relation along the rotor axis and a plurality of classifier blades axially mounted between the disks at the disk periphery. A uniform influx fluid distribution tube disposed between the disks of the classifier rotor is connected to a vacuum source to remove the fines fraction and includes a plurality of perforations of varying sizes in the region between the disks to compensate for velocity and pressure variations within the distribution tube. The perforations are sized to establish and maintain a uniform influx of air along the entire length of the classifier rotor.

Additional objects, advantages, and novel features of this invention shall be set forth in part in the description that follows, and in part will become apparent to those skilled in the art upon examination of the following or may be learned by the practice of the invention. The objects and the advantages of the invention may be realized and attained by means of the instrumentalities and in combinations particularly pointed out in the appended claims.

BRIEF DESCRIPTION OF THE DRAWINGS

The accompanying drawings, which are incorporated herein and form a part of the specification illustrate preferred embodiments of the present invention, and together with the description, serve to explain the principles of the invention. In the drawings.

DETAILED DESCRIPTION OF THE PREFERRED EMBODIMENT

Figure 1:
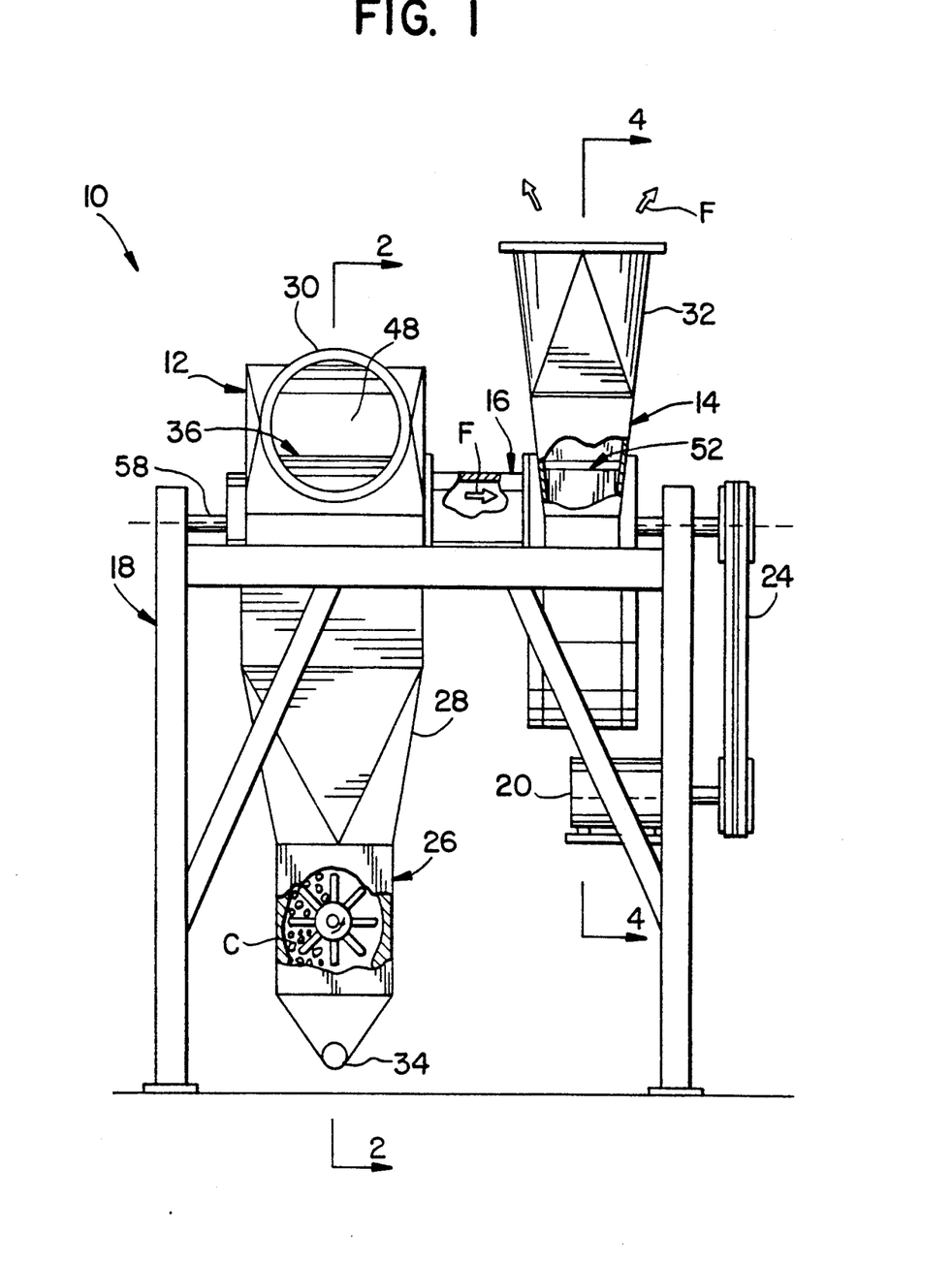
FIG. 1 is a front view in elevation of the improved centrifugal classifier according to the present invention showing the separate classification and fan housings and their interconnection via the combined uniform influx fluid distributor/draft tube assembly.

The improved forced vortex centrifugal classifier 10 according to the present invention is best seen in FIG. 1 and comprises a classification housing 12 and a fan housing 14 fluidically connected by a combination uniform influx distributor/draft tube assembly 16 and mounted to a support frame 18. The classification housing 12 defines a classification chamber 48 (also shown in FIG. 2) and encloses a classifier rotor or centrifugal cage 36. A motor driven rotary air-lock or star valve assembly 26 attached to the coarse fraction collection chamber 28 of classification housing 12 removes the rejected coarse fraction C from housing 12, as will be described in more detail below. Fan housing 14 encloses the centrifugal fan 52 and is connected to a suitable accept system or "baghouse" (not shown) via discharge chute 32, as is well-known.

Figure 3:
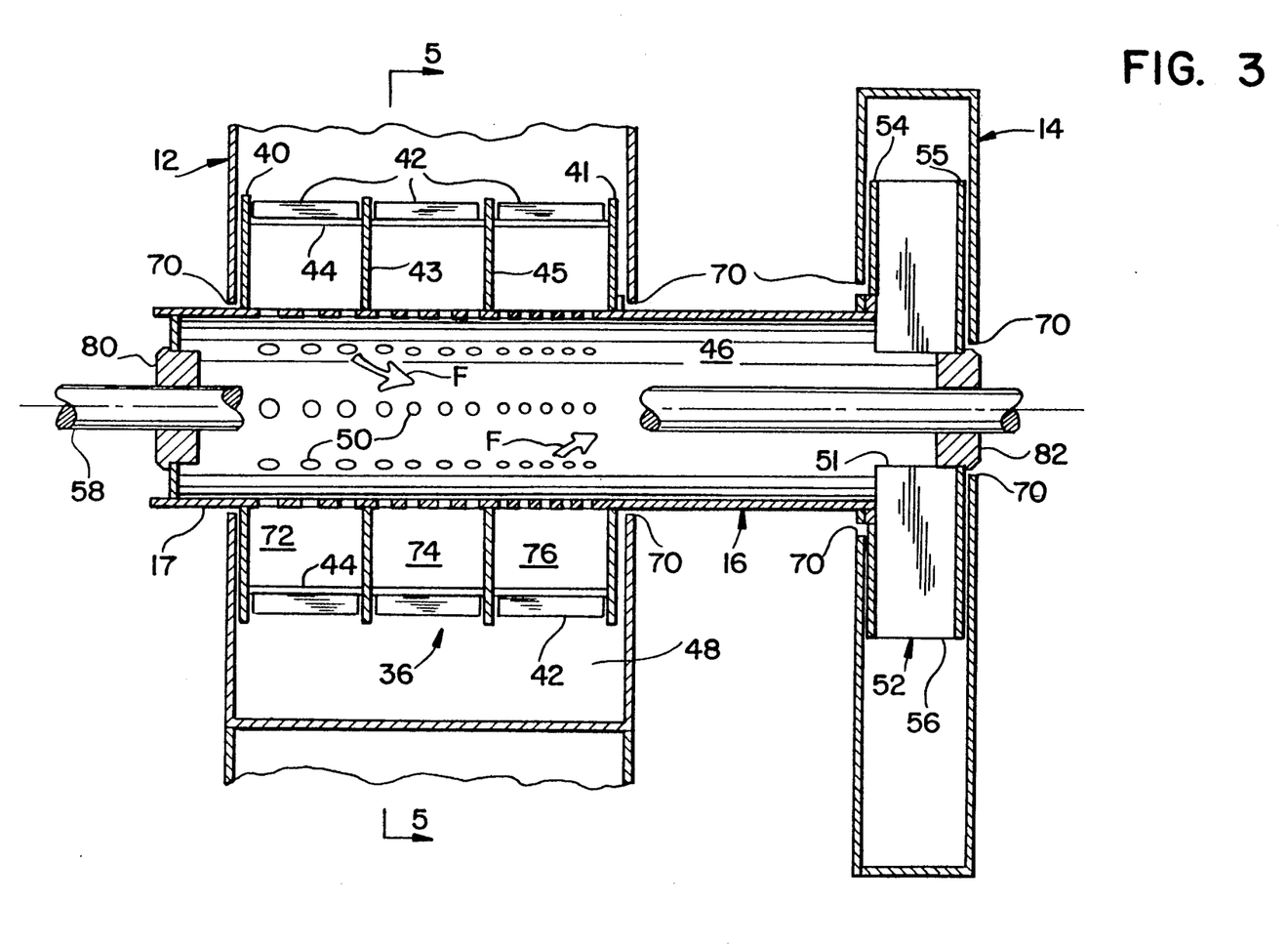
FIG. 3 is a sectional view in elevation of the combined centrifugal cage and fan assembly taken along the line 3—3 of FIG. 2 and also showing the combined uniform influx fluid distributor/draft tube assembly.

Both the classifier rotor or centrifugal cage 36 and the fan 52 are mounted to the combination uniform influx fluid distributor/draft tube assembly 16, which is in turn mounted to a drive shaft 58. A single motor 20 connected to drive shaft 58 via drive belt assembly 24 rotates the entire assembly, so that both the centrifugal cage 36 and fan 52 turn together. The combination uniform influx fluid distributor/draft tube assembly 16 fluidically connects the classifier rotor 36 and fan 52, as best seen in FIG. 3. The uniform influx fluid distributor end 17 of combination distributor/draft tube assembly 16 includes a plurality of perforations 50 having varying sizes through which pass the fines fraction F. The individual perforations 50 are sized and spaced to compensate for velocity and pressure variations within the distributor/draft tube assembly 16, resulting in a uniform airflow along the entire length of the classifier cage 36, as will be described in great detail below. The uniform airflow thus created enhances the classification process and allows a much longer classifier cage to be used for increased throughput while still maintaining an acceptably narrow cut size.

During operation, the powder material to be classified, such as talc, barite, or any other powder-like material, is mixed with clean intake air and the mixture is fed into the classifier inlet 30 by suitable air/powder mixing and feed apparatus (not shown), as is well-known. The rotating fan 52 in fan housing 14 creates a suction that draws the particle laden air from the classification chamber 48 and through the rotating centrifugal cage 36, via the combination distributor/draft tube assembly 16. See FIGS. 2 and 3. In accordance with well-known principles, the centrifugal forces and opposing airflows within classification chamber 48 cause those particles larger than the predetermined cut size to be flung radially outward from the cage 36, whereas the smaller particles are drawn along with the airflow towards the center of the cage as the fines fraction F. The fines fraction F is drawn through the perforations 50 in the uniform influx end 17 of combination distributor/draft tube assembly 16 and on through the draft tube interior 46 by the suction created by fan 52. Finally, the fines fraction F passes through the centrifugal fan 52 and is exhausted out the discharge chute 32 where it is collected by the baghouse system (not shown). The rejected coarse fraction C accumulates in coarse fraction collection chamber 28, passes through rotary air-lock assembly 26, and is carried away by a pneumatic conveyor system 34 to the grinding mill where it can be re-ground into smaller particles and re-classified.

The combination uniform influx fluid distributor/draft tube assembly 16 forms the heart of the invention as it results in a uniform influx of air along the entire length of the centrifugal cage 36, thereby eliminating the problems associated with non-uniform airflow along the cage. For example, the uniform airflow made possible by the uniform influx fluid distributor/draft tube assembly 16 allows the classifier according to the present invention to make precise cuts at the desired cut size and at lower centrifugal forces and pressure drops than any existing classifier system known to the inventor. This uniform airflow also allows a longer classifier cage to be used, thus significantly increasing throughput.

Furthermore, the combination of the classifier cage 36 and fan 52 on a single drive shaft 58 permits more stable and consistent operation of the classifier. While most existing classifier systems experience significant changes in the ratio between pressure drop and operating speed, which adversely affects the classification process and cut size, the combined classifier/fan design according to the present invention results in nearly constant pressure drop ratios at all rotor speeds. Finally, because the fines fraction is removed from the combination distributor/draft tube 16 by the suction developed by the fan 52, the classifier according to the present invention reduces the amount of suction pressure required in the baghouse system, thus further reducing operating costs.

Another significant feature of this invention is that it uses two separate housings, classification housing 12 and fan housing 14, for rejects and accepts, therefore dispensing with the need for labyrinth seals or other complex sealing mechanisms to prevent rejected particles from passing into the classifier cage by short circuiting. The separate housings 12, 14 allow simple airgap seals 70 (FIG. 3) to be used to seal out ambient air. The small amount of ambient air leaking through the seals 70 does not adversely effect the classification process.

Figure 2:
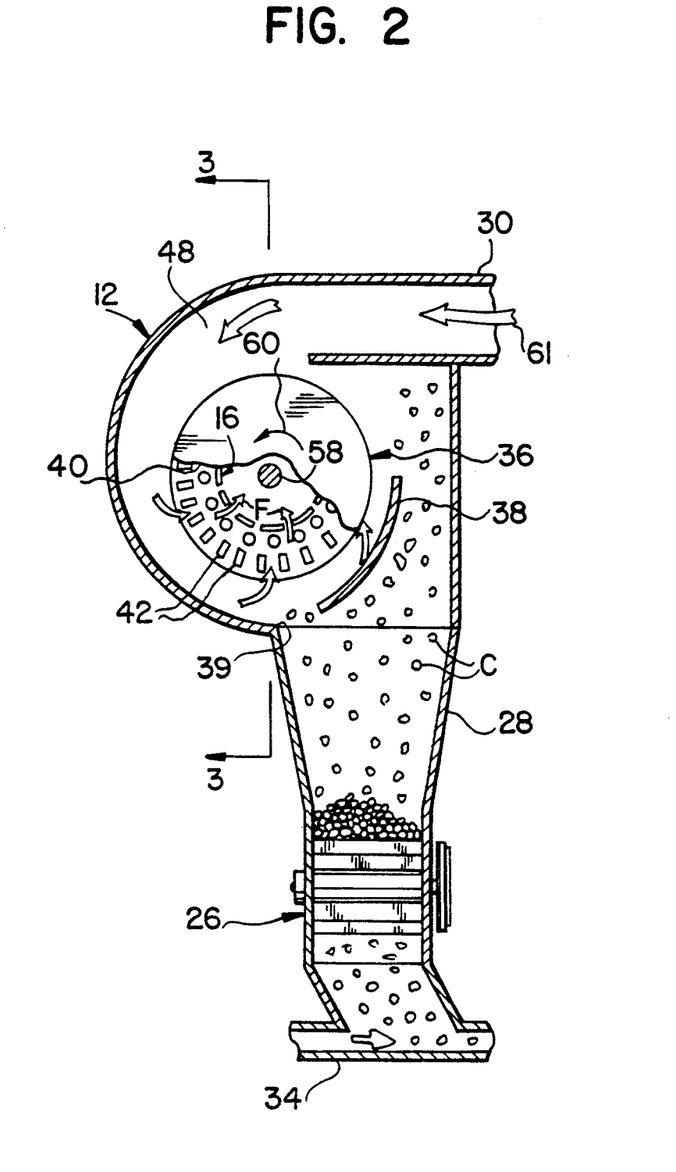
FIG. 2 is a sectional view in elevation of the classification housing taken along the line 2—2 of FIG. 1 more clearly showing the arrangement of the centrifugal cage and uniform influx fluid distributor within the classification chamber and also showing the coarse fraction collection chamber and rotary air valve assembly.
Figure 4:
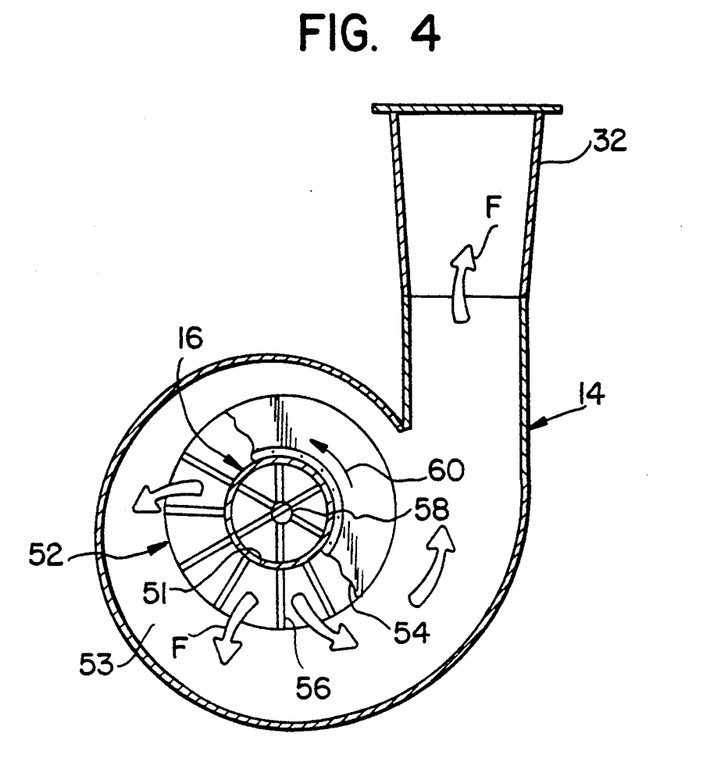
FIG. 4 is a sectional view in elevation of the fan housing taken along the line 4—4 of FIG. 1.

The details of the forced vortex centrifugal classifier 10 are best understood by referring to FIGS. 2, 3, and 4 simultaneously, with occasional reference to FIG. 1. As mentioned above, the classification housing 12 encloses the classifier cage 36 and, in combination with baffle plate 38 and intake chute 30, forms a conventional scroll or classification chamber 48. Gap 39 between the housing 12 and baffle plate 38 allows the coarse particles C to drain from the bottom of the classification chamber during the shut-down cycle when the centrifugal cage 36 is spinning down from full speed. The coarse fraction collection chamber 28 attached to the bottom of the classification housing 12 communicates with a pneumatic conveyor system 34 via rotary air lock valve assembly 26 for removal of the rejected coarse fraction.

Fan housing 14 defines a scroll chamber 53 and encloses the fan 52, as best seen in FIG. 4. Essentially, fan 52 is a simple centrifugal fan and comprises two end plates 54, 55 separated by a plurality of radial fan blades 56. The center annulus, or intake 51, of fan 52 is open to the interior 46 defined by combination uniform influx fluid distributor/draft tube assembly 16, as best seen in FIG. 3.

Both the classifier cage 36 and fan 52 are integral with the uniform influx fluid distributor/draft tube assembly 16, which is in turn mounted to drive shaft 58 by end plates 80, 82, as best seen in FIG. 3. As mentioned above, the entire assembly, including classifier cage 36, fan 52, and combination distributor/draft tube assembly 16, rotate together, permitting more stable and consistent operation of the classifier 10. The combined classifier/fan design also results in constant pressure drop ratios regardless of rotor speed, and allows for the reduction of the suction pressure in the baghouse system, as mentioned above.

Figure 5:
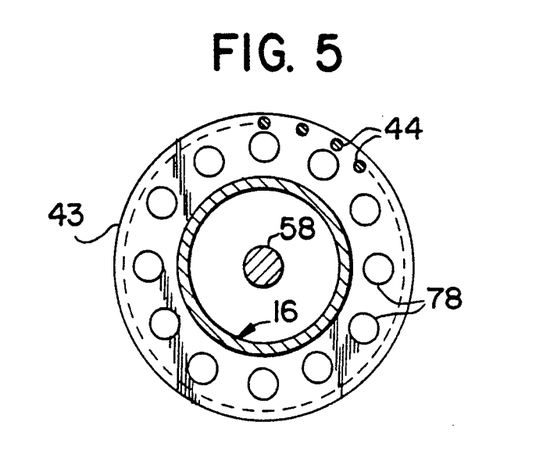
FIG. 5 is a sectional view in elevation of a perforated classifier flange taken along the line 5—5 of FIG. 3.

Classifier cage 36 comprises two end plates 40, 41 and two perforated flanges 43, 45 that are welded in parallel, spaced apart relation to the exterior surface of the uniform influx end 17 of combination distributor/draft tube assembly 16. A plurality of classifier blades 42 attached to pivot rods 44 are axially mounted between the end plates 40, 41 and perforated flanges 43, 45. The pivot rods 44 pass through the perforated flanges 43, 45 and are secured at either end to the end plates 40, 41 by means well-known in the art. The two perforated flanges 43, 45 divide the annulus defined by the combination distributor/draft tube and the classifier blades 42 into three separate classification zones 72, 74, and 76 and provide radial support to the classifier blades 42 and pivot rods 44. Each perforated flange is identical and includes a plurality of perforations 78, as shown in FIG. 5, to equalize the pressure between and among the classification zones 72, 74, and 76 to further enhance classification and ensure a narrow cut size.

The structure thus formed by the combination distributor/draft tube assembly 16 and perforated plates 43, 45 together provide a large degree of torsional stiffness and radial support for the classifier blades 42, thereby allowing relatively long classifier cages to withstand the large torsional and centrifugal forces with a minimum of deflection.

Having described the structure of the forced vortex centrifugal classifier 10 in detail, the operating principles of the classifier can now be more easily described and understood. Referring now to FIGS. 2 and 3 simultaneously with occasional reference to FIG. 4, the shaft 58 of rotor 22 is driven at high speed by motor 20 in the direction of arrow 60. The rotating fan 52 creates a suction that draws air from the classification chamber 48, through the perforations in the uniform influx distributor end 17 of combination distributor/draft tube assembly 16, through draft tube 16 itself, and pumps it out through discharge chute 32 attached to fan housing 14. Once this air flow is established, the powder to be classified is mixed with intake air and fed into the classification chamber 48 via inlet 30, as indicated by arrows 61 in FIG. 2. The centrifugal action of the classifier blades 42 and the swirling vortex associated therewith tends to throw the larger particles or coarse fraction C outward and into coarse fraction collection chamber 28. However, because of the small sizes and lower terminal velocities of the particles in the fines fraction F, they remain entrained in the airflow 61 and are drawn into draft tube 16 through the perforations 50. The fines fraction F is drawn through the draft tube assembly 16, through fan 52, and is blown out discharge chute 32 and collected by the baghouse system (not shown).

As was described above, the sizing and spacing of the perforations 50 in the combination uniform influx fluid distributor/draft tube 16 are critical in achieving the desired uniform fluid influx along the length of the cage 36 and in each classification zone 72, 74, and 76. Accordingly, a system of equations based on recognized fluid flow principles and methods has been derived for the purpose of selecting the proper hole size and spacing required to achieve such a uniform fluid influx along the classifier cage length.

Figure 6:
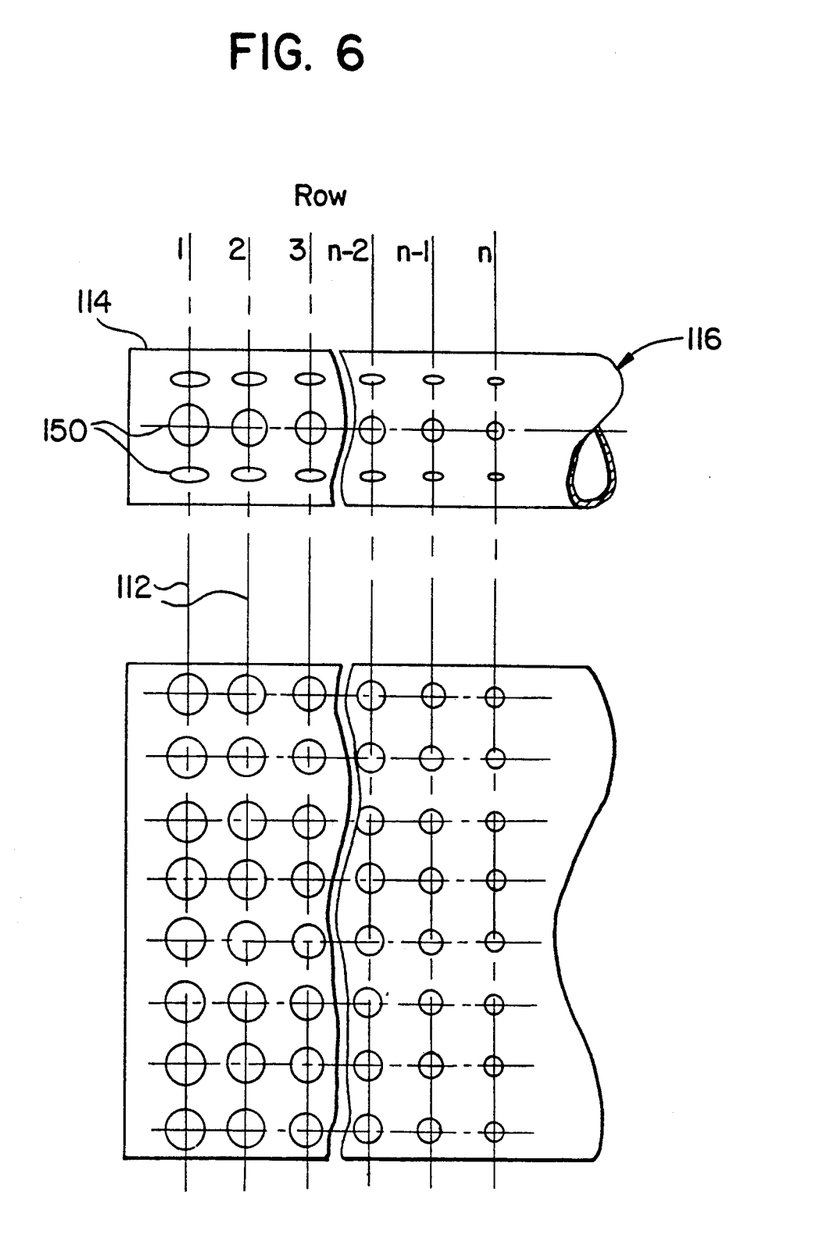
FIG. 6 is a side view in elevation of a uniform influx fluid distributor according to the present invention more clearly showing the arrangement of the variable sized perforations.

Referring now to FIG. 6, a generic uniform influx fluid distributor 116 can be "unwrapped" and considered to be a flat plate having a plurality of perforations 150 arranged along a number of rows 112. Van Winkle et al. developed the following relation for the weight rate flow of fluid through a perforated plate:

$$w = CA_f Y \sqrt{\frac{2g_c \rho_1 \Delta p}{1 - \left(\frac{A_f}{A_p}\right)^2}} \quad (1)$$

where:
w = weight rate of flow
C = orifice coefficient;
$A_f$ = total free area of holes;
Y = expansion factor;
$g_c$ = dimensional constant;
$\rho_1$ = fluid density at upstream pressure and temperature; and
$\Delta p$ = pressure drop across the plate.

Equation (1) accurately predicts the flow for fully turbulent flows with hole Reynolds numbers ranging from 16,000 to 65,000. See *Perry's Chemical Engineers' Handbook*, Sixth Edition, page 5-37, for a full description of Equation (1) and a graph of the perforated plate orifice coefficient C versus hole Reynolds number and physical characteristics of the plate.

The orifice coefficient C varies depending on the pitch-to-diameter ratio and the hole thickness-to-diameter ratio of the uniform influx fluid distributor tube 116. In the preferred embodiment, both of these ratios will vary with hole size since the distance between hole centers is kept constant in the perforation pattern, as seen in FIG. 5. For the range of hole thickness to diameter ratios associated with the preferred embodiment, the orifice coefficient C is consistently predicted with:

$$C = 0.86 \left(\frac{t}{D}\right)^{0.08} \quad (2)$$

where t is the wall thickness of distributor 116 and D is the hole diameter. This orifice coefficient Equation (2) was derived based on ranges of hole sizes from $\frac{3}{8}"$ to 1" and wall thicknesses of 0.12" to 0.5". However, the applicability of Equation (2) beyond these ranges has not been confirmed, in such a case it would be necessary to consult the orifice coefficient tables in *Perry's* to determine the correct orifice coefficient.

Equations (1) and (2) can be combined to yield the following equation for uniform fluid influx rates along the tube length:

$$CFM = 5.15(M)(D)^{1.92} t^{0.08} \sqrt{\frac{\Delta p}{\rho}} \quad (3)$$

where:
CFM = total influx of air in cubic feet per minute;
M = number of holes per row;
D = hole diameter, in inches;
t = wall thickness, in inches;
$\Delta p$ = pressure drop across the perforations, in inches of water; and
$\rho$ = air density in pounds per cubic foot.

If the $\Delta p$'s are kept below 20 inches of water, which is preferred for efficient operation, the expansion factor Y in Equation (1) is approximately equal to unity and can be ignored.

The fluid influx through each successive row of perforations changes the flow conditions as the fluid flows down the interior cavity 46 of distributor 116, so it is necessary to determine the various static pressures within the distributor tube 116 at each successive row of perforations. The static pressures in the subsequent rows can be calculated from the well-known momentum balance equations given in *Perry's* for flow of a fluids in a duct with the addition of a secondary fluid at a plane 2 (in the nomenclature of *Perry's*):

$$(p_2 - p_1)g_c A = w_p(V_p - V_m) + w_s(V_s - V_m) \quad (4)$$

where:
$p_1$ = pressure at plane 1;
$p_2$ = pressure at plane 2;
$g_c$ = dimensional constant;
$A_c$ = cross sectional area of the tube;
$w_p$ = weight rate of flow of the primary fluid;
$V_p$ = velocity of the primary fluid;
$w_s$ = weight rate of flow of secondary fluid;
$V_s$ = velocity of the secondary fluid; and
$V_m$ = velocity of the combined fluids.

Assuming that the velocity of the primary fluid $V_p$ is zero, since it enters the distributor 116 orthogonal to the axial flow in the tube, Equation (4) can be rewritten in the dimensional units and nomenclature adopted herein as:

$$SP_n = SP_{n-1} - \frac{\rho DC(CFM_n + CFM_{n-1})}{542,500 \, A_c^2} \quad (5)$$

where:
$SP_n$ = static pressure at row n;

$SP_{n-1}$ = static pressure at the row immediately before row n;

DC = the total fluid influx for the tube (CFM) divided by the number of rows of perforations;

$CFM_n$ = is the summation of the DCs up to a given row n of perforations. For example, $CFM_3 = DC_1 + DC_2 + DC_3$, or for the desired uniform fluid influx in the preferred embodiment, $CFM_3 = 3DC$.

Note that the coefficient of $A_c$ in Equation (5), i.e., 542,500, also reflects a 5% reduction in the cross sectional area of the tube to compensate for flow irregularities within the tube due to the incoming perpendicular flow through the holes. Therefore, the true cross sectional area of the tube $A_c$ is always used in Equation (5), since the 5% reduction is already accounted for in the coefficient.

The required hole sizes of the tube can now be calculated, stepwise, in the following manner. Equation (3) is used as a starting equation to calculate an initial static pressure $\Delta p$ ($SP_1$) for the first row of perforations at the closed end of the tube 114. A desired hole diameter is selected, which will then help to determine a reasonable number of perforations to be placed around the perimeter of the tube. This number of perforations per row 112 will then remain the same for all rows regardless of the calculated hole size. Since it is desired to calculate the $\Delta p$ for row 1 only, the CFM value in Equation (3) should be the total CFM influx for the entire tube divided by the number of rows of holes. Equation (3) can then be solved to yield the static $\Delta p$ at row 1 (i.e., $SP_1$).

Having established $\Delta p$ for row 1 ($SP_1$), Equation (5) can be used to calculate the successive values for the static pressure $SP_n$ at each subsequent row n. Then, after having calculated the static pressures for each respective row n, the required hole diameter for that respective row n can be calculated by solving Equation (3) for hole diameter D, thus:

$$D_n = \left( \frac{\rho DC^2}{26.5 M^2 (SP_n) t^{0.16}} \right)^{0.26} \quad (6)$$

By way of example, the method and equations described above should yield the following static pressures and hole diameters for a sample uniform influx distributor 116 having the following dimensions:

Inside Diameter = 3.068"
t = 0.185"
Total CFM = 600 cubic feet per minute
Number of Rows = 7
M = 8 holes per row
$\rho$ = 0.075 pounds per cubic foot
$A_c$ = 0.051 square feet
DC = 600/7 or 85.7 cfm/row The following values were calculated for each row of perforations:

| Row | Static Pressure (Inches H$_2$O) | Hole Diameter (Inches) |
| --- | --- | --- |
| 1 | −0.43 | 1.00 |
| 2 | −1.60 | 0.71 |
| 3 | −3.55 | 0.58 |
| 4 | −6.29 | 0.50 |
| 5 | −9.80 | 0.44 |
| 6 | −14.09 | 0.40 |
| 7 | −19.17 | 0.37 |

Note that Equations (3), (5), and (6) incorporate the dimensional constants required for the system of units used in the above example. However, it should be understood that these equations will also accurately predict the required hole sizes for any other system of units, provided that the corresponding dimensional constants are incorporated into the respective equations. Therefore, the present invention should not be considered as being limited to the particular system of units incorporated herein and the use of such other systems of units should be considered to be equivalents.

Finally, it should be noted that the hole sizes calculated for the above example will provide a uniform velocity influx over a wide range of flow rates and are not limited to a flow rate of 600 CFM. Thus, the uniform influx draft tube according to the present invention will allow consistent classifier operation over a wide range of flow rates, further enhancing the utility of the invention.

This completes the detailed description of the preferred embodiment of the improved classifier 10 according to the present invention. While a number of specific components were described above for the preferred embodiment of this invention, persons skilled in this art will readily recognize that other substitute components or combinations of components may be available now or in the future to accomplish comparable functions to make centrifugal air classification apparatus according to this invention. For example, numerous draft tube sizes may be used depending on the particular size of the classifier, and the above-described method for calculating the sizes of the various perforations can be used for any size draft tube. Likewise, myriad configurations for the perforation pattern are possible and could be used to produce the uniform fluid influx along the length of the classifier cage, and the present invention should not be considered as limited to the particular hole patterns shown and described herein.

While the distributor/draft tube assembly 16 of the preferred embodiment rotates with drive shaft 58, classifier cage 36, and fan 52, it would also be possible to replace the rotating distributor/draft tube with a stationary distributor/draft tube assembly that does not rotate with the classifier cage. The necessary modifications required to do so are well-known and could be easily accomplished by persons having ordinary skill in the art. Moreover, the draft tube need not have a closed end 114 as seen in FIG. 6. An equivalent alternative would be to use an open end tube placed in close proximity to the end plate of the classifier cage. The gap between the end of the tube and the end plate of the cage would then be treated as a plurality of holes of such large diameter and spaced so closely together, that they could be considered to have an area equivalent to the area created by the actual gap.

Other possible substitutes have been mentioned throughout this description, and many more equivalents are possible. For example, the uniform influx/draft tube assembly 16 shown and described herein is not limited to use with a blade-type centrifugal cage, and could be easily adapted for use with centrifugal classifiers having bladeless rotors, such as the design disclosed by Lawless et al., in U.S. Pat. No. 4,923,491. Moreover, the uniform influx/draft tube assembly 16 shown and described herein is not limited to use with centrifugal classifiers and could be readily adapted to any use that requires a uniform fluid influx along an elongated cylindrical volume. Furthermore, the uniform influx draft tube could also be used in reverse to uniformly eject and distribute fluid along an elongated cylindrical volume. Therefore, it would be feasible to someone having ordinary skill in the art, in light of this disclosure, to assemble the necessary components to practice this invention, regardless of whether some of such components might not be the same as those described herein.

The foregoing is considered illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to as falling within the scope of the invention as defined by the claims which follow.

The embodiments of the invention in which an exclusive property or privilege is claimed are defined as follows:

1. In a centrifugal particle separator for imparting centrifugal acceleration to a particle laden gas stream having at least one pair of rotor disks mounted in parallel, spaced apart relation and rotating about a rotor axis within a classification chamber, and vacuum pump apparatus communicating with a central coaxial opening between the disks to produce a lower pressure near the center of the disks along the rotor axis than at the periphery, the improvement comprising: a uniform influx fluid distributor tube having a longitudinal axis, disposed between the disks and coaxial with the rotor axis, the interior of which communicates with the vacuum pump apparatus through the central coaxial opening, said distributor tube including a plurality of perforations in different rows along said longitudinal axis and between the disks that are sized and spaced to compensate for velocity and pressure variations within the interior said distributor tube to create a substantially uniform fluid influx outside the distributor tube and between the pair of disks.

2. The improved particle separator of claim 1, wherein said perforations are arranged around said distributor tube in a plurality of rows, with at least one perforation per row, and where the diameter of the perforation in a given row n is substantially defined by the equation:

$$D_n = \left( \frac{\rho \, DC^2}{26.5 \, M^2 \, (SP_n) \, t^{0.16}} \right)^{0.26}$$

where:
$D_n$ = diameter of a perforation at a row n, in inches;
$\rho$ = fluid density in pounds per cubic foot;
$DC$ = total fluid influx divided by the number of rows in cubic feet per minute per row;
$M$ = total number of rows;
$SP_n$ = static pressure at a row n in inches of water; and
$t$ = thickness of the tube in inches.

3. Apparatus for separating aerosol particles from a gas stream, comprising:
centrifugal rotor means for imparting centrifugal acceleration to the particle laden gas stream having a first disk mounted at a proximal end and a second disk mounted at a distal end, said first and second disks being mounted in parallel, spaced-apart relation about a rotor axis and being enclosed in a classification chamber;
uniform influx fluid distribution tube means having a proximal end and a distal end disposed between the first and second disks and concentric with the rotor axis and having a plurality of perforations of varying sizes in the region between the first and second disks to create a substantially uniform fluid influx outside the uniform influx fluid distribution tube means and between said first disk and said second disk; and
vacuum pump means communicating with the interior of said uniform influx fluid distribution tube at the proximal end to produce a lower pressure within said distribution tube than the space between the first and second disks.

4. The apparatus for separating aerosol particles from a gas stream of claim 3, wherein said perforations are arranged around said distribution tube in a plurality of rows, with at least one perforation per row, and where the diameter of the perforation in a given row n is substantially defined by the equation:

$$D_n = \left( \frac{\rho \, DC^2}{26.5 \, M^2 \, (SP_n) \, t^{0.16}} \right)^{0.26}$$

where:
$D_n$ = diameter of a perforation at a row n, in inches;
$\rho$ = fluid density in pounds per cubic foot;
$DC$ = total fluid influx divided by the number of rows in cubic feet per minute per row;
$M$ = total number of rows;
$SP_n$ = static pressure at a row n in inches of water; and
$t$ = thickness of the tube in inches.

5. The apparatus for separating aerosol particles from a gas stream of claim 4, wherein said vacuum pump means includes fan means fluidically connected to the interior space of said uniform influx distribution tube.

6. The apparatus for separating aerosol particles from a gas stream of claim 5, wherein said fan means is disposed within a fan housing separate from the classification housing.

7. The apparatus for separating aerosol particles from a gas stream of claim 6, wherein said fan means is mounted to said centrifugal rotor means, so that said fan means and said centrifugal rotor means rotate together.

8. The apparatus for separating aerosol particles from a gas stream of claim 7, wherein said centrifugal rotor means includes a plurality of pivotally mounted classifier blades mounted axially between said first and second disks and at about the periphery of said disks.

9. The apparatus for separating aerosol particles from a gas stream of claim 8, wherein said centrifugal rotor means includes a perforated flange mounted between said first and second disks, said perforated flange adapted to support said pivotally mounted classifier blades.

10. The apparatus for separating aerosol particles from a gas stream of claim 9, wherein said uniform influx distribution tube includes draft tube means mounted to said proximal end of said uniform influx distribution tube for fluidically connecting said uniform influx distribution tube to said fan.

11. The apparatus for separating aerosol particles from a gas stream of claim 10, wherein said uniform influx distribution tube rotates with said classifier rotor and said fan.

12. The apparatus for separating aerosol particles from a gas stream of claim 11, wherein the particle laden gas stream is introduced tangentially to said classifier rotor from a direction orthogonal to said rotor axis.

13. In a centrifugal particle separator for imparting centrifugal acceleration to a particle laden gas stream having at least three rotor disks mounted in parallel, spaced apart relation and rotating about a rotor axis, and a vacuum pump apparatus communicating with a central coaxial opening between the disks to produce a lower pressure near the center of the disks along the rotor axis than at the periphery, the improvement comprising: a uniform influx fluid distribution tube having a longitudinal axis, disposed between the disks and coaxial with the rotor axis, the interior of which communicates with the vacuum pump apparatus, said distribution tube including a plurality of perforations in different rows along said longitudinal axis that are sized and spaced to compensate for velocity and pressure variations within the interior said distribution tube to create a substantially uniform velocity distribution outside the tube and between any pair of disks.

14. The improved particle separator of claim 13, wherein said perforations are arranged around said distribution tube in a plurality of rows, with at least one perforation per row, and where the diameter of the perforation in a given row n is substantially defined by the equation:

$$D_n = \left( \frac{\rho\, DC^2}{26.5\, M^2\, (SP_n)\, t^{0.16}} \right)^{0.26}$$

where:

$D_n$ = diameter of a perforation at a row n, in inches;
$\rho$ = fluid density in pounds per cubic foot;
DC = total fluid influx divided by the number of rows in cubic feet per minute per row;
M = total number of rows;
$SP_n$ = static pressure at a row n in inches of water; and
t = thickness of the tube in inches.

15. A uniform influx fluid distributor, comprising a elongated hollow draft tube having a longitudinal axis, a blind end and an open end, the open end being adapted for connection to a vacuum pump to reduce the pressure inside said draft tube, and having a plurality of perforations in different rows along a predetermined length of the longitudinal axis of said tube, wherein said perforations are sized and spaced to compensate for velocity and pressure variations within the interior of said tube to create a substantially uniform longitudinal influx of fluid along the predetermined length of said elongated draft tube.

16. The uniform influx fluid distributor of claim 15, wherein said perforations are arranged around said draft tube in a plurality of rows, with at least one perforation per row, and where the diameter of the perforations in a given row n is substantially defined by the equation:

$$D_n = \left( \frac{\rho\, DC^2}{26.5\, M^2\, (SP_n)\, t^{0.16}} \right)^{0.26}$$

where:

$D_n$ = diameter of a perforation at a row n, in inches;
$\rho$ = fluid density in pounds per cubic foot;
DC = total fluid influx divided by the number of rows in cubic feet per minute per row;
M = total number of rows;
$SP_n$ = static pressure at a row n in inches of water; and
t = thickness of the tube in inches.

* * * * *